United States Patent
Jaffrey

(10) Patent No.: US 6,904,394 B2
(45) Date of Patent: Jun. 7, 2005

(54) NURBS BASED CNC MACHINE PROCESS USING BOOLEAN SUBSTRACTION

(75) Inventor: Syed Kamal H. Jaffrey, Watertown, MA (US)

(73) Assignee: Delta Search Labs, Inc., Cambridge, MA (US)

( * ) Notice: Subject to any disclaimer, the term of this patent is extended or adjusted under 35 U.S.C. 154(b) by 208 days.

(21) Appl. No.: 09/949,526

(22) Filed: Sep. 7, 2001

(65) Prior Publication Data

US 2003/0050726 A1 Mar. 13, 2003

(51) Int. Cl.$^7$ ................................................. G06G 7/48
(52) U.S. Cl. ........................... 703/6; 703/3; 700/98; 700/121; 700/187; 700/188; 700/189
(58) Field of Search ........................... 703/3, 6; 700/98, 700/121, 187, 188, 189

(56) References Cited

U.S. PATENT DOCUMENTS

| | | | |
|---|---|---|---|
| 3,727,191 A | 4/1973 | McGee ..................... | 340/172.5 |
| 4,794,540 A | 12/1988 | Gutman et al. ........ | 364/474.29 |
| 5,028,855 A | 7/1991 | Distler et al. .......... | 318/568.13 |
| 5,140,236 A | 8/1992 | Kawamura et al. ...... | 318/568.1 |
| 5,227,978 A | 7/1993 | Kato ..................... | 364/474.31 |
| 5,321,623 A | 6/1994 | Ensenat et al. ........ | 364/474.31 |
| 5,710,709 A | 1/1998 | Oliver et al. ............... | 700/184 |
| 5,726,896 A | 3/1998 | Jia et al. ................. | 364/474.29 |
| 6,021,358 A | 2/2000 | Sachs et al. .................. | 700/98 |

OTHER PUBLICATIONS

Baxter et al., "Shaping the Future: Andrew Baxter and Anna Kochan Conclude a Round-up on Machine Tools", Financial Times, London, Sep. 11, 1997, p. 11.*

"Nurbs (B–Spline) Path Generator", Unigraphics: Nurbs, pp. 1–2 [online] [retrieved on Jan. 16, 2001] Retrieved from the Internet <URL:http://www.ugsolutions.com/products/unigraphics/cam/nurbs/>.

"NURBS Interpolation: Advanced Techniques Take Out More Cycle Time", Source: Competitive Mold Maker, vol. 3, No. 2, (1999) pp. 1–5 [online] [retrieved on Oct. 11, 2001] Retrieved from the Internet <URL:http://www.moldmaker-mag.com/cover8.html>.

"What's new on CATIA Users Page?", last modified May 9, 2001, pp. 1, [online] [retrieved on May 22, 2001] Retrieved from the Internet <URL:http://www.catia.com/wnew/html/index.shtml>.

"EDS PLM Solutions", pp. 1, [online] [retrieved on Oct. 18, 2001] Retrieved from the Internet <URL:http://www.sdrc.com>.

(Continued)

*Primary Examiner*—Jean Homere
*Assistant Examiner*—Herng-der Day
(74) *Attorney, Agent, or Firm*—A. Jason Mirabito, Esq.; Mintz Levin; C. E. Schulman, Esq.

(57) ABSTRACT

A method and apparatus is directed to an integration of a computer modeling process in which a Computer Numerically Controlled (CNC) machine is used for manufacture or rapid prototyping. As a result, conventional processes that require a level of human interface during the intermediate stages are minimized or otherwise removed. Intermediate stages include Computer Aided Design(CAD) stage, Computer Aided Engineering (CAE) stage, Computer Aided Manufacturing (CAM) stage and Computer Numerical Controlled (CNC) machine stage. By using Non-Uniform Rational B-Splines (NURBS), a CAD data file is converted for direct input to the CNC machine that is able to read NURBS instruction codes. In particular, the method and apparatus is a paradigm shift (from conventional approaches to minimizing human interfaces in which the product features are defined) to NURBS which describes geometrically the difference between the material blank from which the product (or prototype) is made and the product itself using boolean substraction.

4 Claims, 5 Drawing Sheets

OTHER PUBLICATIONS

Bedworth, D. et al., "Computer Integrated Design and Manufacturing", pp. 281–291; McGraw–Hill, Inc. (1991).

Beard, T., "Feature Article: Interpolating Curves", pp. 1–5, [online] [retrieved on Oct. 11, 2001] Retrieved from the Internet <URL:http://www.mmsonline.com/articles/109704.html>.

Hillaire, R. et al., "Geometry for Precision Manufacturing on an Open Architecture Machine Tool (MOSAIC–PC)", Mosaic–PC, CyberCut, pp. 1–2, [online] [retrieved on Jan. 16, 2001] Retrieved from the Internet <URL:http://cybercut.berkeley.edu/html/research/project_mosaic_pc.htm>.

Zelinski, P., "Feature Article: Understanding NURBS Interpolation", Feature—Understanding NURBS Interpolation, pp. 1–5 [online] [retrieved on Oct. 11, 2001] Retrieved from the Internet <URL:http://www.mmsonline.com/articles/079901.html>.

Besl (1998). "Hybrid Modeling for Manufacturing using NURBS, Polygons, and 3D Scanner Data" *IEEE International Symposium on Circuits and Systems* 5: 484–487.

Jerard, et al. (1998). "Facile: A Clean Interface for Design and Fabrication" *Proceedings of the Design Engineering Technical Conferences*: 1–11.

Piegl (1991). "On NURBS: A Survey" *IEEE Computer Graphics and Applications* 11: 55–71.

Spence, et al. (1999). "Integrated Solid Modeler Based Solutions for Machining" *ACM Fifth Symposium on Solid Modeling and Applications*: 296–305.

International Search Report for PCT US 02/28492, mailed Dec. 13, 2002.

* cited by examiner

NURBS BASED CNC MACHINE PROCESS USING BOOLEAN SUBSTRACTION

BACKGROUND OF THE INVENTION

1. Field of the Invention

The invention relates to a method and system for integrating a computer modeling process in which a Computer Numerically Controlled (CNC) machine is used for manufacture and in particular to a CNC machine having a CNC controller with Non-Uniform Rational B-Splines (NURBS) interpolation capabilities.

2. Background of the Invention

One method of fabricating products is to use a Computer Numerical Controlled (CNC) machine. A product suitable for CNC machining process is typically designed using modeling software implemented in a computer. FIG. 1 illustrates a prior art system 100 comprising a computer 110 and a CNC machine 120. The computer 110 is implemented with Computer Aided Design (CAD) 112, Computer Aided Engineering (CAE) 114 and Computer Aided Manufacturing (CAM) 116 software that allows a designer to model the product that is suitable for fabrication by the CNC machine 120. Usually a product model 118 is initially drawn in 2-dimensional (2-D) drawing using CAD software 112. The CAD software 112 converts the 2-D drawing into 3-dimensional (3-D) drawing, which represents a 3-D model of the product model 118. The 3-D model is tested using CAE software 114 for structural, thermal and NVH (noise, vibration and harshness) conditions. If the test conditions are satisfactory, the 3-D model is transformed using the CAM software 116 into instruction codes 119 that are understandable by the CNC machine 120.

One well known format of CNC instruction codes is known as "g-codes." G-codes are translation instructions in which G0 represents a linear movement, and G02 and G03 represent circular or arcuate movements for the CNC machine 120. A contour that cannot be represented by G02 or G03 instructions is represented by series of short lines and/or curves that approximate the contour. The process for creating a g-code file involves defining a series of g-codes that represent various contours of the product model 118, and defining the requirements of the CNC machine 120. CNC machine 120 requirements include identifying and labeling features of the 3-D model, selecting cutting tools (that include pre-defining material properties), pre-defining finishing, determining machining speeds and defining an orientation of a blank material.

Using rational spline curves to define contours of a product model have become popular. In particular, a form of rational spline curve instruction code that is quite popular is the Non-Uniform Rational B-Splines (NURBS). NURBS allow a complex contour to be represented by a fewer number of codes than those using g-codes. Furthermore, NURBS provide for a better curvature control. NURBS equations are used to produce a mesh that effectively describes the product being modeled and also provides for an overlap between each surface description equation.

After the instruction codes 119 defining the product model 118 are formulated, the instruction codes 119 are passed to the CNC Controller 122 of the CNC machine 120. The CNC controller 122 uses the instruction codes 119 (that can comprise of g-codes and NURBS, among others) to appropriately control the cutting tool 124 to machine the material blank into the machined part.

The above described process requires a large amount of manual (human) interventions particularly at the CAD/CAE stage and CAM stage, and between the CAM stage and CNC machine stage. For instance, the g-code file activities described above often require a significant level of documentation that require a skilled personnel and is rather time consuming. Because the g-code file is usually created with a particular CNC machine in mind and also reflects a particular approach and style of the person performing the task, portablility from machine to machine is usually difficult to achieve between machine to machine. In addition, calibration and orientation problems can arise at the CNC stage due to lack of process planning and optimization at the CAD/CAE stage and CAM stage.

Attempts to integrate between the various stages have resulted in a discipline known as "Computer Aided Process Planning (CAPP)." FIG. 2 illustrates a flow process of a known CAPP system. At block 202, a CAD data file that represents the three-dimensional (3-D) drawing of the product model is passed to block 204 where the CAD data file is converted into a universal design data model. Standards to perform this conversion process have included specifications such as Initial Graphics Exchange Specification (IGES) and Product Data Exchange Specification (PDES). These standards provide basis for an ISO Standard for Transfer and Exchange of Product Model Data (STEP) that, in turn, provides the basis for automated information transfer from the CAD data file to the universal design data model. Further reading concerning the aforementioned standards are found in David D. Bedworth, Mark R. Henderson, Philip M. Wolfe, *Computer Integrated Design and Manufacturing,* (McGraw-Hill, Inc., 1991).

The universal design data model is passed to block 206, where various part features of the data model are defined by a part feature recognition software. Software with part features recognition capabilities include Pro/Engineer software available from Parametric Technology based in Waltham, Mass. and I-DEAS software available from Structural Dynamics Research Corporation based in Milford, Ohio. Also, the reference Computer Integrated Design and Manufacturing describes various references pertaining to part features recognition endeavors. With the various part features of the data model defined, the universal design data model is passed to block 208 where it is converted to CNC instruction codes. The compilation of the CNC instruction codes therefore relies, in large part, on the feature recognition software to define the various part features of the universal design data model.

In addition, the engineering specification needs to be described in terms that are understandable by the CAM software. A known approach focuses on the notion of part feature recognition in which individual features such as "hole", "slot", "chamfer", "gear tooth" and etc. are defined. Because direct recognition of these features is problematic, a coding scheme accompanied with textual description is generally used. A number of packages have been developed to convert the engineering specification into a series of feature definitions, however these have provided limited levels of automation that is generally limited to relatively simple features.

It is desirable to have a more integrated system that optimizes the CNC machining process, minimizes documentation in the instruction code files and further minimizes human intervention.

SUMMARY OF THE INVENTION

According to one aspect of the invention, a method of integrating a computer modeling process in which a Computer Numerically Controlled (CNC) machine is used for manufacture, the CNC machine having a CNC controller with Non-Uniform Rational B-Splines (NURBS) interpolation capabilities, the method comprises receiving a computer aided drawing (CAD) data file, generating a NURBS based three-dimensional (3-D) geometric model of a product model defined by the CAD data file, receiving a size and dimension of a blank in which a product is to be formed, generating a NURBS based 3-D geometric model of the blank and performing a boolean subtraction that subtracts the NURBS based 3-D geometric model of the blank from the NURBS based 3-D geometric model of the product model such that a NURBS based 3-D geometric definition of a material to be removed from the blank is formed.

Other features can include cutting along a path defined by the NURBS based 3-D geometric definition of the material to be removed from the blank; using a pre-configured database to select a tool appropriate for cutting along the path; performing an algebraic iterative process between the NURBS based 3-D geometric model of the blank and the NURBS based 3-D geometric model of the product model until an optimal orientation is ascertained; and performing a simulation of a product manufacture prior to releasing NURBS based instruction codes to the CNC machine.

According to another aspect of the invention, an apparatus for integrating a computer modeling process in which a CNC machine is used for manufacture, the CNC machine having a CNC controller with NURBS interpolation capabilities, the apparatus comprises a NURBS meshing module to receive a CAD data file and to generate a NURBS based 3-D geometric model of a product model defined by the CAD data file, a blank definition module to transmit a size and dimension of a blank in which a product is to be formed to the NURBS meshing module, wherein the NURBS meshing module generates a NURBS based 3-D geometric model of the blank, a boolean subtraction module to receive the NURBS based 3-D geometric model of the blank and the NURBS based 3-D geometric model of the product model from the NURBS meshing module and to perform a boolean subtraction such that a NURBS based 3-D geometric definition of a material to be removed from the blank is formed.

Other features can include a cutting module to receive the NURBS based 3-D geometric definition of a material to be removed from the blank from the boolean subtraction module and to define a cutting path based on the NURBS based 3-D geometric definition of the material to be removed from the blank; a pre-configured database coupled to the cutting module, wherein the cutting module retrieves information stored in the database to select a tool appropriate for the cutting path; the boolean subtraction module further comprises an object orientation module to perform an algebraic iterative process between the NURBS based 3-D geometric model of the blank and the NURBS based 3-D geometric model of the product model until an optimal orientation is ascertained; and a simulation module coupled to the cutting module to perform a simulation of a product manufacture prior to releasing NURBS based instruction codes to the CNC machine.

According to another aspect of the invention, an apparatus for integrating a computer modeling process in which a CNC machine is used for manufacture, the CNC machine having a CNC controller with NURBS interpolation capabilities, the apparatus comprises means for receiving a CAD data file and generating a NURBS based 3-D geometric model of a product model defined by the CAD data file, means for determining a size and dimension of a blank in which a product is to be formed and sending the size and dimension of the blank to the generating means, wherein the generating means generates a NURBS based 3-D geometric model of the blank, and means for receiving the NURBS based 3-D geometric model of the blank and the NURBS based 3-D geometric model of the product model from the generating means and performing a boolean subtraction such that a NURBS based 3-D geometric definition of a material to be removed from the blank is formed.

Other features can include means for receiving the NURBS based 3-D geometric definition of a material to be removed from the blank from the boolean subtraction means and defining a cutting path based on the NURBS based 3-D geometric definition of the material to be removed from the blank; the boolean subtraction means further comprises means for performing an algebraic iterative process between the NURBS based 3-D geometric model of the blank and the NURBS based 3-D geometric model of the product model until an optimal orientation is ascertained; means for performing a simulation of a product manufacture prior to releasing NURBS based instruction codes to the CNC machine.

According to another aspect of the invention, a system for integrating a computer modeling process comprises a computer including a NURBS meshing module to receive a CAD data file and to generate a NURBS based 3-D geometric model of a product model defined by the CAD data file, a blank definition module to transmit a size and dimension of a blank in which a product is to be formed to the NURBS meshing module, wherein the NURBS meshing module generates a NURBS based 3-D geometric model of the blank, a boolean subtraction module to receive the NURBS based 3-D geometric model of the blank and the NURBS based 3-D geometric model of the product model from the NURBS meshing module and performs a boolean subtraction such that a NURBS based 3-D geometric definition of a material to be removed from the blank is formed, a cutting module to receive the NURBS based 3-D geometric definition of a material to be removed from the blank from the boolean subtraction module and to define a cutting path based on the NURBS based 3-D geometric definition of the material to be removed from the blank, and a Computer Numerically Controlled (CNC) machine coupled to the computer and having a CNC controller with Non-Rational B-Splines (NURBS) interpolation capabilities, the CNC controller configured to receive NURBS based instruction codes from the cutting module of the computer. Other aspects and features of the invention will become apparent in the detailed description to follow.

BRIEF DESCRIPTION OF THE DRAWINGS

For better understanding of the invention, reference is made to the drawings which are incorporated herein by reference and in which.

DETAILED DESCRIPTION

The present invention is directed to an integration of a computer modeling process in which a Computer Numerically Controlled (CNC) machine is used for manufacture or rapid prototyping. As a result, conventional processes that require a level of human interface during the intermediate stages are minimized or otherwise removed. Intermediate stages include Computer Aided Design(CAD) stage, Computer Aided Engineering (CAE) stage, Computer Aided Manufacturing (CAM) stage and Computer Numerical Controlled (CNC) machine stage. By using Non-Uniform Rational B-Splines (NURBS), a CAD data file is converted for direct input to the CNC machine that is able to read NURBS instruction codes. In particular, the present invention is a paradigm shift (from conventional approaches to minimizing human interfaces in which the product features are defined) to NURBS which describes geometrically the difference between the material blank from which the product (or prototype) is made and the product itself using boolean substraction.

In accordance with the invention, problems associated with feature recognition software is minimized by taking advantage of the geometric definition created by NURBS. NURBS generate a 3-D geometric model that can be used to provide CNC instruction codes to the CNC machine. There are many CNC machines available commercially that recognize NURBS instruction codes such as Makino (of Mason, Ohio.) A66 high speed machining center fitted with GE Fanuc (of Charlottesville, Va.) CNC controller with NURBS interpolation capabilities. An illustrated operation is now described with reference to FIG. 3 and FIG. 4.

Figure 1:
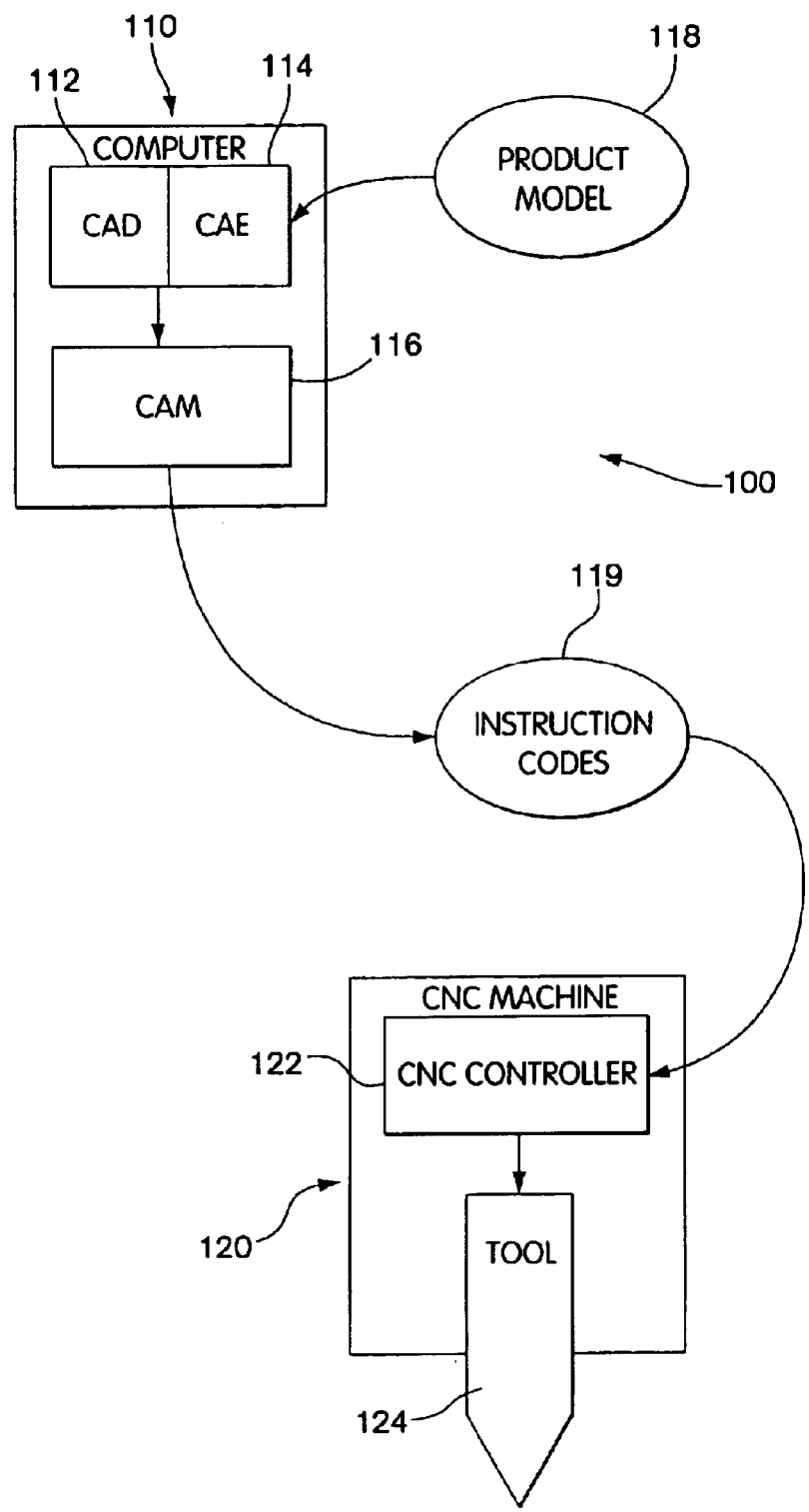
FIG. 1 illustrates a system that includes a Computer Numerical Controlled (CNC) machine.
Figure 2:
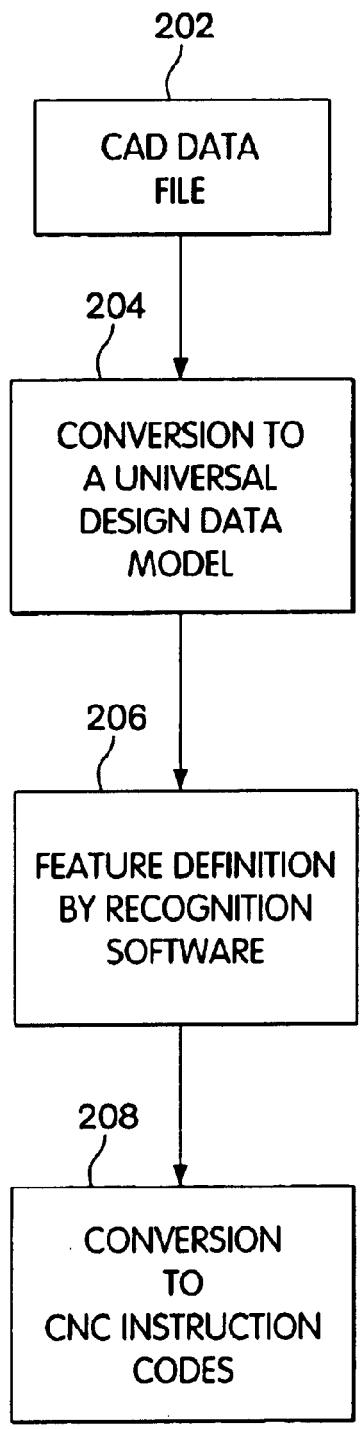
FIG. 2 illustrates a Computer Aided Process Planning (CAPP) system for integrating from Computer Aided Design (CAD) to Computer Aided Manufacturing (CAM) process.
Figure 3:
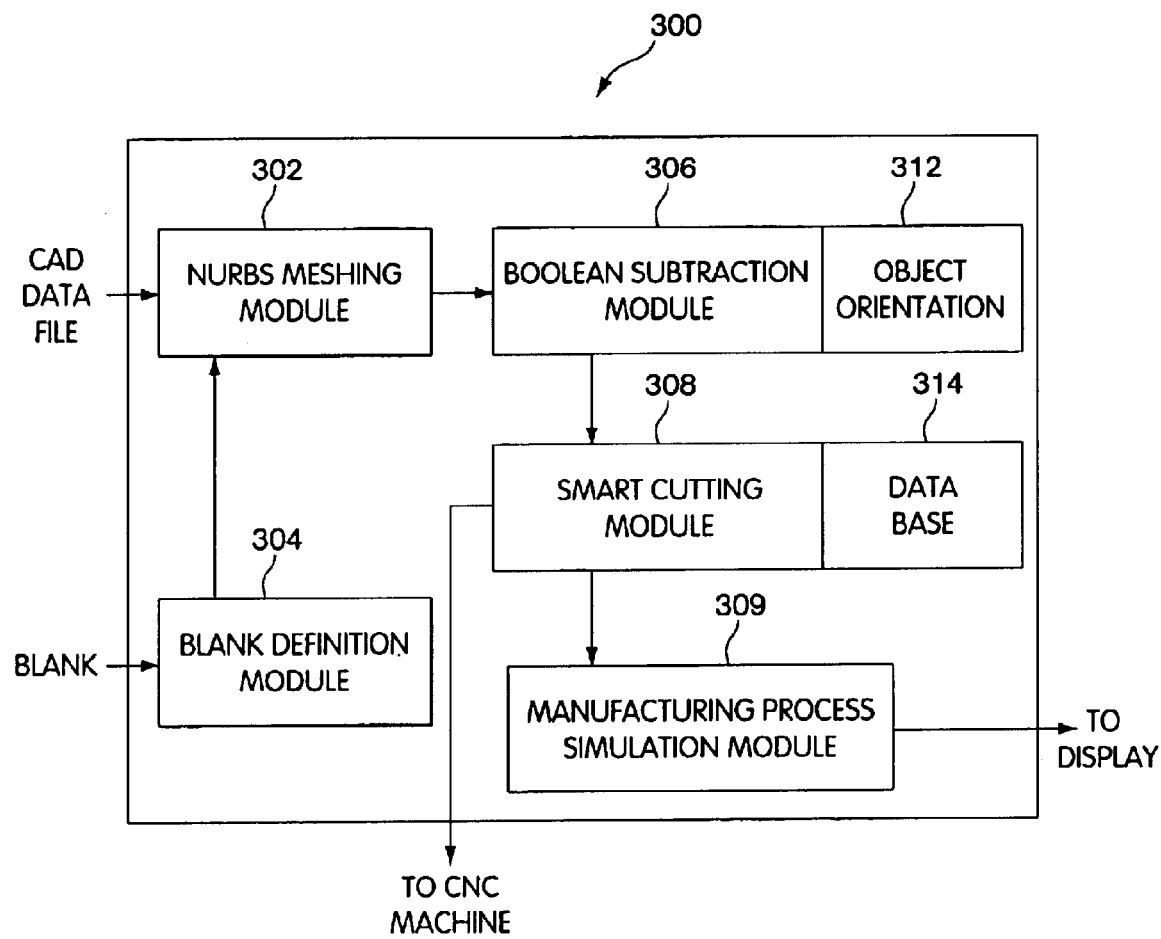
FIG. 3 illustrates a NURBS based CNC machine system in accordance with the present invention.
Figure 4:
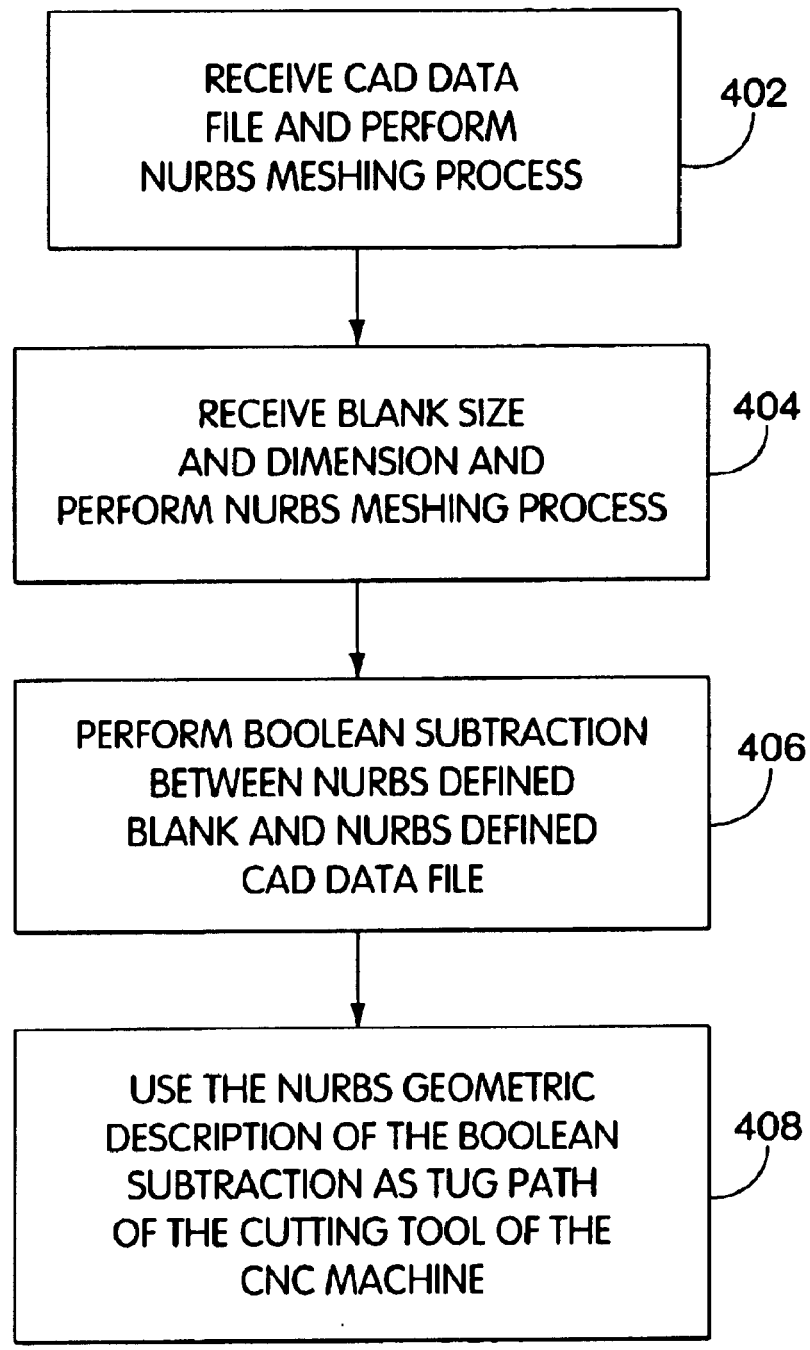
FIG. 4 illustrates a flow process of the NURBS based CNC machine system of FIG. 3.

Referring to FIG. 3, the NURBS based system 300 for generating NURBS instructions for the CNC controller in accordance with the invention comprises a NURBS meshing module 302, a blank definition module 304 and a boolean subtraction module 306. As optional features, the NURBS based system 300 can further include a smart cutting module 308 and a manufacturing process simulation module 309. According to one embodiment of the invention, the NURBS based system 300 can be implemented as software or hardware (such as ASIC) in the computer 110, which is illustrated in FIG. 1. The operation of the various modules are now described with reference to FIG. 4.

At block 402, the NURBS meshing module 302 receives a CAD data file and performs a NURBS meshing process on the CAD data file to create a NURBS based model of the product model. NURBS can create a robust and accurate geometric description of the product model so that the definition of a contour is not lost. At the CAM stage, NURBS can define points along the contour such that a CNC machine stage can interpolate the arcs along the path created by the points. Thus, NURBS data can be used to control the CNC machine movements via the CNC controller to perform a highly accurate and improved surface finish.

At block 404, the blank definition module 304 performs a process on a blank in which the blank size and dimensions are defined. This process can be performed by human interaction or alternatively, the process can be performed by using known machine vision technology. Once the blank size and dimensions are defined, this information is passed to the NURBS meshing module to perform a NURBS meshing of the blank. As will be apparent below, the role of the blank definition module 304 provides a basis for the boolean subtraction module to perform its function.

At block 406, the boolean subtraction module 306 subtracts the NURBS meshing definition of the blank from the NURBS meshing definition of the product model, which creates a NURBS meshing definition of the material to be removed from the blank from which the product is formed.

Figure 5:
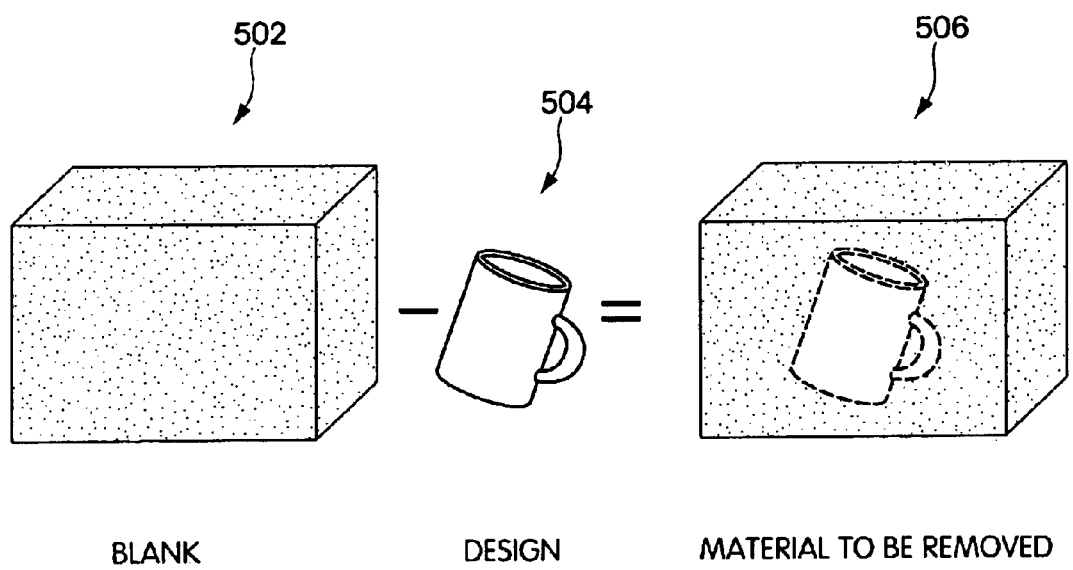
FIG. 5 illustrates an operation of a boolean subtraction module of the NURBS based CNC machine system.

An example of a boolean substraction process is illustrated in FIG. 5. At stage 502, the size and dimension of the material block is defined using the blank definition module 304. At stage 504, the defined material block along with the product model (in a CAD data file), which in this instance is a cup, are NURBS meshed using the NURBS meshing module 302. The NURBS meshed cup is then subtracted from the NURBS meshed material blank resulting in a NURBS meshed model, which is the model of the material to be moved (stage 506). The effect of this is that the geometric description (i.e. material to be removed) is directly related to the machining action (i.e. removing material) and therefore the machine tool can directly follow (or surf) the path described by the NURBS equations.

An additional feature of the boolean subtraction module 306 is an object orientation module 312 that performs appropriate orientation and tolerance levels on the boolean subtracted model to maximize cost effectiveness and robustness. This can be performed using an algebraic iterative process between the NURBS meshed product model and the NURBS meshed blank model until an optimal orientation and pre-defined tolerance levels are reached.

The optional smart cutting module 308 accesses the material specification and screw threads/types etc., which may be defined in the CAD data file. The smart cutting module 308 may also search a machine handbook, pre-stored tool characteristics, material specification and other aspects pertaining to CNC machining process in a pre-configured database 314. As a consequence, it can automatically select the appropriate tool for the task. The smart cutting module 308 then selects the path of the cutter or tool and can define an optimized pattern to minimize cutting and drilling operations etc. irrespective of the product feature types. This is because the smart cutting module 308 follows rules based on spatial geometric constraints described by the NURBS mesh rather than any pre-defined feature definition (pockets, holes, chamfers etc. do not require to be defined).

Another option is the manufacturing process simulation module 309 that conducts a simulation of the production (in a display) before finally releasing the instruction codes to the CNC machine. This simulation confirms waste minimization and strength optimization of the prototype. As a backup to the simulation, the software can support machines with optical sensors and associated in-process convex hull testing that continually checks for tool fit.

One or more advantages are achieved using one or more embodiments described above. The part features recognition, the CNC g-code conversion and much of the manual process planning element is removed from human responsibility thereby providing for a more integrated and automated system. The invention provides for calculating the optimal blank material, size and shape, selects the most appropriate tooling and determines the correct orientation. In combination, this ensures the most effective use of material. The blank sizing and orientation process within the system ensures blank sizing and part orientation that does not compromise part robustness during the manufacturing process.

Having thus far described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. Accordingly, the invention is defined by the following claims and equivalents thereof.

What is claimed is:

1. A method of integrating a computer modeling process in which a Computer Numerically Controlled (CNC) machine is used for manufacture, the CNC machine having a CNC controller with Non-Uniform Rational B-Splines (NURBS) interpolation capabilities, the method comprising:

receiving a computer aided drawing (CAD) data file;

generating a NURBS based three-dimensional (3-D) geometric model of a product model defined by the CAD data file;

receiving a size and dimension of a blank in which a product is to be formed;

generating a NURBS based 3-D geometric model of the blank;

performing an algebraic iterative process between the NURBS based 3-D geometric model of the blank and the NURBS based 3-D geometric model of the product model until an optimal orientation is ascertained and pre-defined tolerance levels are reached;

calculating an optimal blank material size and shape to ensure effective use of material;

performing a boolean subtraction that subtracts the NURBS based 3-D geometric model of the blank from the NURBS based 3-D geometric model of the product model such that a NURBS based 3-D geometric definition of a material to be removed from the blank is formed;

performing a simulation of a product manufacture to confirm waste minimization and strength optimization prior to releasing NURBS based instruction codes to the CNC machine; and cutting alone a path defined by the NURBS based 3-D geometric definition of the material to be removed from the blank and using a pre-configured database to automatically select a tool appropriate for cutting along the path.

2. An apparatus for integrating a computer modeling process in which a Computer Numerically Controlled (CNC) machine is used for manufacture; the CNC machine having a CNC controller with Non-Uniform Rational B-Splines (NURBS) interpolation capabilities, the apparatus comprising:

a NURBS meshing module to receive a computer aided drawing (CAD) data file and to generate a NURBS based three-dimensional (3-D) geometric model of a product model defined by the CAD data file;

a blank definition module to transmit a size and dimension of a blank in which a product is to be formed to the NURBS meshing module, wherein the NURBS meshing module generates a NURBS bused 3-D geometric model of the blank;

a boolean subtraction module to receive the NURBS based 3-D geometric model of the blank and the NURBS based 3-D geometric model of the product model from the NURBS meshing module and to perform a boolean subtraction such that a NURBS based 3-D geometric definition of a material to be removed from the blank is formed, the boolean subtraction module comprising an object orientation module to perform an algebraic iterative process between the NURBS based 3-D geometric model of the blank and the NURBS bused 3-D geometric model of the product model until an optimal orientation is ascertained and pre-defined tolerances levels are reached; and a calculation module operative to calculate an optimal blank material, size and shape to ensure effective use of material;

a cutting module to receive the NURBS based 3-D geometric definition of a material to be removed from the blank from the boolean subtraction module and to define a cutting path based on the NURBS based 3-D geometric definition of the material to be removed from the blank;

a pre-configured database coupled to the cutting module, wherein the cutting module retrieves information stored in die database to automatically select a tool appropriate for the cutting path; and a simulation module coupled to the cutting module to perform a simulation of a product manufacture to confirm waste minimization and strength optimization prior to releasing NURBS based instruction codes to the CNC machine.

3. An apparatus for integrating a computer modeling process in which a Computer Numerically Controlled (CNC) machine is used for manufacture, the CNC machine having a CNC controller with Non-Uniform Rational B-Splines (NURBS) interpolation capabilities, the apparatus comprising:

means for receiving a computer sided drawing (CAD) data file and generating a NURBS based three-dimensional (3-D) geometric model of a product model defined by the CAD data file;

means for determining a size and dimension of a blank in which a product is to be formed and sending the size and dimension of the blank to the generating means, wherein the generating means generates a NURBS based 3-D geometric model of the blank;

means for receiving the NURBS based 3-D geometric model of the blank mid the NURBS based 3-D geometric model of the product model from the generating means;

means for performing a boolean subtraction such that a NURBS based 3-D geometric definition of a material to be removed from the blank is formed, wherein the means for performing a boolean subtraction comprises means for performing an algebraic iterative process between the NURBS based 3-D geometric model of the blank and the NURBS based 3-D geometric model of the product model until an optimal orientation is ascertained and pre-defined tolerance levels are reached; and calculation means operative to calculate an optimal blank material, size and shape to ensure effective use of material;

cutting path means for receiving the NURBS based 3-D geometric definition of a material to be removed from the blank from the boolean subtraction means and defining a cutting path based on the NURBS based 3-D geometric definition of the material to be removed from the blank;

pre-configured database means coupled to the cutting path means, wherein the cutting path means retrieves information stored in the database means to automatically select a tool appropriate for the cutting path; and means for performing a simulation of a product manufacture to confirm waste minimization and strength optimization prior to releasing NURBS based instruction codes to the CNC machine.

4. A system for integrating a computer modeling process comprising:
 a computer including:
  a Non-Uniform Rational B-Splines (NURBS) meshing module to receive a computer aided drawing (CAD) data file and to generate a NURBS based three-dimensional (3-D) geometric model of a product model defined by the CAD data file;
  a blank definition module to transmit a size and dimension of a blank in which a product is to be formed to the NURBS meshing module, wherein the NURBS meshing module generates a NURBS based 3-D geometric model of the blank;
  a boolean subtraction module to receive the NURBS based 3-D geometric model of the blank and the NURBS based 3-D geometric model of the product model from the NURBS meshing module and performs a boolean subtraction such that a NURBS based 3-D geometric definition of a material to be removed from the blank is formed, wherein the boolean subtraction module comprises
   an object orientation module to perform an algebraic iterative process between the NURBS based 3-D geometric model of the blank and the NURBS based 3-D geometric model of the product model until an optimal orientation is ascertained and pre-defined tolerance levels are reached; and
   a calculation module operative to calculate an optimal blank material, size and shape to ensure effective use of material;
  a cutting module to receive the NURBS based 3-D geometric definition of a material to be removed from the blank from the boolean subtraction module and to define a cutting path based on the NURBS based 3-D geometric definition of the material to be removed from the blank;
  a pre-configured database coupled to the cutting module, wherein the cutting module retrieves information stored in the database to automatically select a tool appropriate for the cutting path; and
  a simulation module coupled to the cutting module to perform a simulation of a product manufacture to confirm waste minimization and strength optimization prior to releasing NURBS based instruction codes to the CNC machine; and
 a Computer Numerically Controlled (CNC) machine coupled to the computer and having a CNC controller with NURBS interpolation capabilities, the CNC controller configured to receive NURBS based instruction codes from the cutting module of the computer.

* * * * *

UNITED STATES PATENT AND TRADEMARK OFFICE
CERTIFICATE OF CORRECTION

PATENT NO. : 6,904,394 B2
DATED : June 7, 2005
INVENTOR(S) : Syed Kamal H. Jaffrey It is certified that error appears in the above-identified patent and that said Letters Patent is hereby corrected as shown below:

Column 7,
Line 20, insert a comma between the words "MATERIAL" and "SIZE".
Line 50, change "BUSED" to -- BASED --.

Column 8,
Line 12, change "DIE" to -- THE --.
Line 25, change "SIDED" to -- AIDED --.
Line 35, change "MID" to -- AND --.

Signed and Sealed this

Sixth Day of September, 2005

JON W. DUDAS
*Director of the United States Patent and Trademark Office*